United States Patent
Guo et al.

(10) Patent No.: US 12,024,426 B2
(45) Date of Patent: Jul. 2, 2024

(54) DEVICE FOR PRODUCING HYDROGEN THROUGH PHOTOTHERMAL COUPLING OF SOLAR ENERGY BASED ON FREQUENCY DIVISION TECHNOLOGY

(71) Applicant: XI'AN JIAOTONG UNIVERSITY, Shaanxi (CN)

(72) Inventors: Liejin Guo, Xi'an (CN); Dengwei Jing, Xi'an (CN); Zilong Zeng, Xi'an (CN); Lijing Ma, Xi'an (CN); Maochang Liu, Xi'an (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 457 days.

(21) Appl. No.: 16/982,065

(22) PCT Filed: Jul. 31, 2019

(86) PCT No.: PCT/CN2019/098662
§ 371 (c)(1),
(2) Date: Sep. 18, 2020

(87) PCT Pub. No.: WO2020/206883
PCT Pub. Date: Oct. 15, 2020

(65) Prior Publication Data
US 2022/0024759 A1    Jan. 27, 2022

(30) Foreign Application Priority Data

Apr. 9, 2019  (CN) .......................... 201910280478.7

(51) Int. Cl.
C01B 3/04    (2006.01)
B01J 19/12   (2006.01)
B01J 35/39   (2024.01)

(52) U.S. Cl.
CPC ............. *C01B 3/042* (2013.01); *B01J 19/123* (2013.01); *B01J 19/128* (2013.01); *B01J 35/39* (2024.01);
(Continued)

(58) Field of Classification Search
CPC ........... C01B 3/042; C01B 2203/0277; C01B 2203/0833; C01B 2203/82; B01J 35/36;
(Continued)

(56) References Cited

U.S. PATENT DOCUMENTS 4,342,738 A    8/1982  Burgund
8,691,068 B1   4/2014  Huang et al.
(Continued)

FOREIGN PATENT DOCUMENTS

CN    103383150 A    11/2013
CN    107255368 A    10/2017
(Continued)

OTHER PUBLICATIONS

Steinfeld, Aldo. "Solar thermochemical production of hydrogen—a review." Solar energy 78.5 (2005): 603-615. (Year: 2005).*
(Continued)

*Primary Examiner* — Robert J Eom
(74) *Attorney, Agent, or Firm* — W&G Law Group

(57) ABSTRACT

The present disclosure discloses a device for producing hydrogen through photothermal coupling of solar energy based on a frequency division technology, including a photothermal coupling reactor and a liquid storage tank and so on; during operation, a test sample containing a photothermal catalyst is placed in the photothermal coupling reactor, a light source is divided into an infrared light part and an ultraviolet light part through the solid-state frequency divider, energy of the infrared light part is finally transferred to the photothermal coupling reactor, and the ultraviolet
(Continued)

light part is projected onto the photothermal catalyst. The present disclosure is used for an experiment for producing hydrogen through photothermal coupling of catalyst particles, and has advantages of environmental protection, high efficiency, simple and convenient operation and the like.

10 Claims, 1 Drawing Sheet

(52) U.S. Cl.
CPC ............... *B01J 2219/00087* (2013.01); *C01B 2203/0277* (2013.01); *C01B 2203/0833* (2013.01); *C01B 2203/82* (2013.01)

(58) Field of Classification Search
CPC .................... B01J 19/123; B01J 19/128; B01J 2219/00087
See application file for complete search history.

(56) References Cited

U.S. PATENT DOCUMENTS

| | | |
|---|---|---|
| 2011/0297531 A1 | 12/2011 | Nakanishi et al. |
| 2014/0130843 A1 | 5/2014 | Kostuk et al. |
| 2014/0272623 A1 | 9/2014 | Jennings |

FOREIGN PATENT DOCUMENTS

| | | |
|---|---|---|
| CN | 107416768 A | 12/2017 |
| CN | 107634109 A | 1/2018 |
| CN | 108055001 A | 5/2018 |
| CN | 108759120 A | 11/2018 |
| CN | 109336051 A | 2/2019 |
| CN | 109987581 A | 7/2019 |
| WO | 2009158385 A2 | 12/2009 |
| WO | 2015191581 A1 | 12/2015 |

OTHER PUBLICATIONS

González-Pardo, Aurelio, Thorsten Denk, and Alfonso Vidal. "Heliostat aiming strategy of 3 cylindrical cavity-receivers integrated in a 750 KW solar tower hydrogen plant." AIP Conference Proceedings. vol. 2033. No. 1. AIP Publishing, 2018. (Year: 2018).*

Gao, Minmin, et al. "Solar absorber material and system designs for photothermal water vaporization towards clean water and energy production." Energy & Environmental Science 12.3 (2019): 841-864. (Year: 2018).*

International Search Report (PCT/CN2019/098662); Date of Mailing: Dec. 30, 2019.

CN First Office Action(201910280478.7); Date of Mailing: Jun. 2, 2020.

* cited by examiner

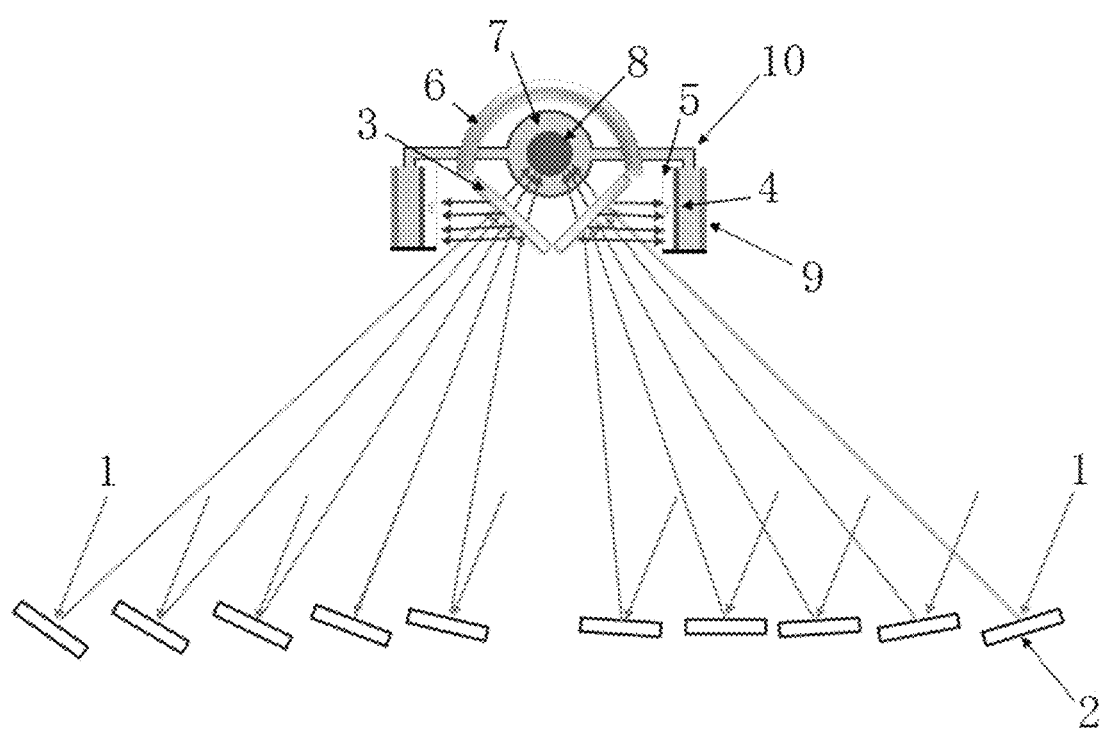

DEVICE FOR PRODUCING HYDROGEN THROUGH PHOTOTHERMAL COUPLING OF SOLAR ENERGY BASED ON FREQUENCY DIVISION TECHNOLOGY

TECHNICAL FIELD

The present disclosure relates to the field of new energy preparation technologies and in particular, to a device for producing hydrogen through photothermal coupling of solar energy based on frequency division technology.

BACKGROUND

In recent years, the United States, Japan, Europe and other countries have launched fierce competition in commercialization of vehicles having hydrogen fuel cells. The Chinese government is also actively promoting development of the hydrogen energy industry, and a hydrogen fuel cell energy supply technology has rapidly advanced in commercialization. However, China has not yet formed a complete hydrogen energy supply technology system, key technologies such as hydrogen storage and hydrogen gas transportation are not mature, an industry chain of the hydrogen energy supply is weak, strength of hydrogenation companies is not strong, and there are relatively few hydrogen gas purification, storage and transportation companies. Thus, the development of the hydrogen-production technology is quite necessary. Producing hydrogen gas by decomposing water through photothermal coupling is a low-cost, highly efficient and non-polluting hydrogen-production method. Moreover, solar energy is inexhaustible and is excellent clean energy, thus a method of producing hydrogen by decomposing water through photothermal coupling of solar energy can effectively relieve pressure on construction of hydrogen refueling stations.

A photocatalytic reaction uses a suitable semiconductor material as a photocatalyst, and under light irradiation at a specific wavelength, the photocatalyst is internally excited by light to generate electrons and hole pairs, which are respectively migrated to a surface of the catalyst to have oxidization and reduction reactions with water or organic molecules, so as to store the solar radiation light energy into target products (for example, to produce the hydrogen gas). Previous studies only focused on structure properties of a photocatalytic material itself and its chemical reactions mostly from perspectives of the material and chemistry, and ignored a strong coupling effect between the catalytic material and an energy conversion system in which it is involved, resulting in that a total energy conversion efficiency of this process has been hovering at a low level. A traditional solar thermal chemical hydrogen-production technology mainly converts an infrared part of the solar energy into chemical energy, and energy of an ultraviolet visible light region, which accounts for nearly half of the solar spectrum, cannot be effectively utilized. Meanwhile, a solar photocatalytic hydrogen-production technology mainly uses the energy of the ultraviolet visible region of the solar energy, and the infrared part is wasted meaninglessly. Obviously, if the above two technologies can be effectively combined, that is, to achieve photothermal coupling hydrogen-production, then it is expected to break upper limits of the solar energy conversion efficiencies of the two technologies described above, thereby greatly improving a hydrogen-production efficiency of the solar energy. However, at present, there are not many scientific research and institutions at home and abroad that study the photothermal coupling water-decomposition to produce hydrogen, and there are relatively few experimental devices for researchers, thus it is needed to design a new device for producing hydrogen by decomposing water through photothermal coupling of solar energy for experimental exploration.

SUMMARY

An object of the present disclosure is to provide a device for producing hydrogen through photothermal coupling of solar energy based on a frequency division technology, and this device can be used to study hydrogen-production effects of a series of photothermal catalyst particles.

The present disclosure is implemented using following technical solutions:

Provided is a device for producing hydrogen through photothermal coupling of solar energy based on a frequency division technology, mainly including a circular arc-shaped secondary reflection element, a photothermal coupling reactor, a plurality of reflectors, and a liquid storage tank having a hollow cavity.

The liquid storage tank has an inverted U shape, the circular arc-shaped secondary reflection element is provided directly above the liquid storage tank and has an opening facing downward, the liquid storage tank is communicated at a middle position through a temperature-controlled fluid layer, the photothermal coupling reactor is wrapped in the temperature-controlled fluid layer, two solid-state frequency dividers are symmetrically arranged directly under the photothermal coupling reactor, a heat-absorbing fluid layer and a vacuum layer are sequentially provided at inner sides of two sides of the liquid storage tank, and the plurality of the reflectors are arranged side by side directly under the liquid storage tank; during operation, a test sample containing a photothermal catalyst is placed in the photothermal coupling reactor, a light source is collected to the solid-state frequency divider through the reflectors that are arranged side by side, the solid-state frequency dividers divide the light source into an infrared light part and an ultraviolet light part, and after energy of the infrared light part passes through the vacuum layer and the heat-absorbing fluid layer, the energy is transferred to the temperature-controlled fluid layer, and the temperature-controlled fluid layer transfers thermal energy to the photothermal coupling reactor, and the ultraviolet light part directly penetrates the temperature-controlled fluid layer to project light onto the photothermal catalyst in the photothermal coupling reactor.

Further improvement of the present disclosure lies in that, the reflectors are linear Fresnel reflectors, and reflective surfaces of the reflectors are capable of being rotated based on different orientations of solar radiation light.

Further improvement of the present disclosure lies in that, a plate-type secondary reflection element is further provided at an outer side of the two sides of the liquid storage tank, and is configured to reflect energy of the infrared light part that is not completely absorbed by the heat-absorbing fluid layer, which is then absorbed by the heat-absorbing fluid layer.

Further improvement of the present disclosure lies in that, the plate-type secondary reflection element has a height consistent with heights of the two sides of the liquid storage tank.

Further improvement of the present disclosure lies in that, the solid-state frequency divider is capable of setting different frequencies or wavelengths of the infrared light and the ultraviolet light based on actual optical/thermal unit ratio requirements.

Further improvement of the present disclosure lies in that, the vacuum layer and the heat-absorbing fluid layer each have a height consistent with heights of the two sides of the liquid storage tank.

Further improvement of the present disclosure lies in that, the device is formed into a symmetrical structure in entirety along a central axis.

Further improvement of the present disclosure lies in that, the light source is solar radiation light irradiated onto a surface of the earth all year round.

Further improvement of the present disclosure lies in that, the photothermal catalyst is a semiconductor catalyst capable of absorbing the ultraviolet light part and part of visible light, and a corresponding wavelength ranges from 180 nm to 700 nm.

Further improvement of the present disclosure lies in that, a working medium in the liquid storage tank is a mixture of water and ethylene glycol.

The present disclosure has following beneficial technical effects:

For the device for producing hydrogen through photothermal coupling of solar energy based on a frequency division technology provided by the present disclosure, a test sample containing the photothermal catalyst is placed in the photothermal coupling reactor, the light source is collected to the solid-state frequency dividers through the reflectors that are arranged side by side, the solid-state frequency dividers divide the light source into an infrared light part and an ultraviolet light part, and after energy of the infrared light part passes through the vacuum layer and the heat-absorbing fluid layer, the energy is transferred to the temperature-controlled fluid layer, and the temperature-controlled fluid layer transfers the thermal energy to the photothermal coupling reactor, and the ultraviolet light part directly penetrates the temperature-controlled fluid layer to project light onto the photothermal catalyst in the photothermal coupling reactor. The circular arc-shaped secondary reflection element is placed above the photothermal coupling reactor and reflects the ultraviolet light to a surface of the catalyst once again after the ultraviolet light part penetrates the solid-state frequency divider and the photothermal coupling reactor, thereby improving a utilization rate of the light. Therefore, the present disclosure can provide a catalyst performance test environment which couples two physical fields of light and heat for the photothermal coupling catalytic water-decomposition catalyst, and provides an experimental device for scientific researchers to further study catalytic mechanisms of the photothermal coupling catalyst to decompose water to produce hydrogen. In the present disclosure, based on light radiation characteristics of the solar energy at different times in different seasons and through setting of the intelligent frequency divider, an input ratio of the light and the heat and a working mode of the system for producing hydrogen through photothermal coupling can be dynamically adjusted, thereby providing specific reaction conditions for the photothermal coupling reaction. The input ratio of the light and heat units, reaction time, etc. can be controlled manually.

Further, solid-state frequency dividers that are symmetrical to each other are placed above the linear Fresnel reflector, and are configured to separate an infrared light region and an ultraviolet light region of the solar radiation light having different frequencies, and can control the respective input ratios.

Further, a vacuum layer is provided at an inner side of the liquid storage tank in contact with air, thereby preventing heat-absorbing fluid from resulting in more heat loss due to air convection.

Further, the heat-absorbing fluid layer on two sides of the liquid storage tank are disposed between the vacuum layer and the plate-type secondary reflection element, to facilitate maximum absorption of thermal energy of the infrared part of the solar radiation light.

Further, the plate-type secondary reflection element is provided at an outer side of the liquid storage tank in contact with air, so that a part of the infrared light not completely absorbed is reflected again to the heat-absorbing fluid layer, thereby ensuring an absorption rate of the infrared light part.

Further, the photothermal coupling reactor is wrapped by a temperature-controlled fluid layer that is uniform and stable, and the fluid having a constant temperature can ensure that the photothermal reactor is heated uniformly and the catalyst has a better heat absorption effect.

Further, the entire device is formed into an axisymmetric structure with better stability.

Further, the light source used in the experiment is the solar radiation light that is irradiated onto a surface of the earth all year round.

In summary, the present disclosure greatly increases intensity of incident light through a low-cost light condenser, the solar energy is mainly divided, through the frequency divider, into two parts of energy: the infrared part and the ultraviolet part, energy of the infrared part is absorbed by the heat-adsorbing fluid and then the thermal energy is transferred through a plate-type heat exchanger to the temperature-controlled fluid layer using water/ethylene glycol as the working medium, the energy of the ultraviolet part is directly irradiated onto the surface of the photothermal catalyst after penetrating the frequency divider and the temperature-controlled fluid, to induce the catalyst to function, so as to achieve a purpose of photothermal coupling. Based on radiation characteristics of the solar energy in different seasons and at different times, the temperature of photothermal reaction can directionally control the input ratio of the light and heat and working modes of the system for producing hydrogen through photothermal coupling, and intelligence can be achieved. In addition, the plate-type secondary reflection element and the vacuum layer can avoid convective heat loss of the hot fluid with the air as much as possible, and full utilization of the ultraviolet light of the reaction part can also be ensured. The present disclosure is used for an experiment for producing hydrogen through photothermal coupling of catalyst particles and has advantages of environmental protection, high efficiency, high intelligence, simple and convenient operation and the like.

BRIEF DESCRIPTION OF DRAWINGS

FIG. 1 is a schematic diagram of the present disclosure.

EXPLANATION OF REFERENCE SIGNS 1. light source; 2. linear Fresnel reflector; 3. solid-state frequency divider; 4. heat-absorbing fluid layer; 5. vacuum layer; 6. circular arc-shaped secondary reflection element; 7. temperature-controlled fluid layer; 8. photothermal coupling reactor; 9. plate-type secondary reflection element; 10. liquid storage tank.

DESCRIPTION OF EMBODIMENTS

The present disclosure will be described in details in the following in conjunction with specific embodiments. The following specific embodiments help those skilled in the art to further understand the present disclosure, but do not limit the present disclosure in any form. It should be noted that, various deformations and modifications can be made to the device without departing from a concept of the present disclosure. These all belong to a protection scope of the present disclosure.

As shown in FIG. 1, the present disclosure provides a device for producing hydrogen through photothermal coupling of solar energy based on a frequency division technology, and the device includes: a circular arc-shaped secondary reflection element 6, a photothermal coupling reactor 8, a plurality of linear Fresnel reflectors 2, and a liquid storage tank 10 having a hollow cavity and an open bottom. The circular arc-shaped secondary reflection element 6 has an opening facing downward and is provided directly above the liquid storage tank 10. The liquid storage tank 10 using water/ethylene glycol as a working medium is communicated at a middle position through a temperature-controlled fluid layer 7, and the photothermal coupling reactor 8 is wrapped in the temperature-controlled fluid layer 7, two solid-state frequency dividers 3 are symmetrically arranged directly under the photothermal coupling reactor 8. A heat-absorbing fluid layer 4 and a vacuum layer 5 are provided in sequence at inner sides of two sides of the liquid storage tank 10. The plurality of the linear Fresnel reflectors 2 are arranged side by side directly under the liquid storage tank 10. During operation, a test sample containing a photothermal catalyst is placed in the photothermal coupling reactor 8, and the light source 1 is collected to the solid-state frequency dividers 3 through the reflectors that are arranged side by side, then the solid-state frequency dividers 3 divide the light source 1 into an infrared light part and an ultraviolet light part. After energy of the infrared light part passes through the vacuum layer 5 and the heat-absorbing fluid layer 4, the energy is transferred to the temperature-controlled fluid layer 7, and the temperature-controlled fluid layer 7 transfers thermal energy to the photothermal coupling reactor 8. The ultraviolet light part directly penetrates the temperature-controlled fluid layer 7 to project the light onto the photothermal catalyst in the photothermal coupling reactor 8.

Preferably, a plurality of the linear Fresnel reflectors 2 are placed side by side directly under the entire device for producing hydrogen, and a reflective surface of the linear Fresnel reflector 2 can be rotated based on different orientations of solar radiation light. The linear Fresnel reflector 2 reflects the solar radiation light to the solid-state frequency divider 3, and the solid-state frequency divider 3 can set different frequencies or wavelengths of the infrared light and the ultraviolet light based on actual optical/thermal unit ratio requirements.

Preferably, the vacuum layer 5 is provided at an inner side of the heat-absorbing fluid layer 4 in contact with air, and has a height consistent with heights of two sides of the liquid storage tank 10. The heat-absorbing fluid layer 4 is arranged between the vacuum layer and the temperature-controlled fluid layer 7, and has a height consistent with the height of the two sides of the liquid storage tank 10.

Preferably, a plate-type secondary reflection element 9 is provided at an outer side of the liquid storage tank 10 in contact with air, has a height consistent with the heights of the two sides of the liquid storage tank 10, and is configured to reflect energy of the infrared light part that is not absorbed by the heat-absorbing fluid layer 4 so as to make it be further absorbed by the heat-absorbing fluid layer 4.

Preferably, the device shall be formed into a symmetrical structure in entirety along a central axis. A periphery of the photothermal reactor is wrapped in the temperature-controlled fluid layer 7 that is uniform and stable. The light source 1 is solar radiation light irradiated onto a surface of the earth all year round.

The device for producing hydrogen through photothermal coupling of solar energy based on a frequency division technology provided by the present disclosure has a specific working process as follows.

The light source 1 is irradiated onto the linear Fresnel reflectors 2 that are arranged side by side, and the solar radiation light is reflected to the solid-state frequency divider 3 by specular reflection. A direction of the linear Fresnel reflector 2 can be adjusted based on the direction of radiation of the solar radiation light, to ensure that the light is reflected to the solid-state frequency divider 3 at an optimal orientation. The solid-state frequency dividers 3 divide the light into the infrared light part and the ultraviolet light part at different ratios based on a temperature of photothermal reaction during reaction. The infrared light part passes through the vacuum layer 5 and is then absorbed by the heat-absorbing fluid layer 4, so that light energy is converted into thermal energy and stored in the heat-absorbing fluid. The heat-absorbing fluid layer 4 transfers the thermal energy to the temperature-controlled fluid layer 7 through a plate-type heat exchanger. The photothermal coupling reactor 8 is wrapped in the temperature-controlled fluid layer 7, which is similar to a principle of "water bath" heating. The ultraviolet light part penetrates the solid-state frequency divider 3 and the temperature-controlled fluid 7 and is then directly irradiated onto the surface of the catalyst mixed in the reaction fluid, so as to induce photochemical reaction. Combined with the thermal energy previously obtained by conversion of the infrared light part, an effect of photothermal coupling is achieved.

During the experiment, the orientation of the linear Fresnel reflector 2 should be adjusted in real time based on the orientation of the solar radiation light, to ensure that the light reflected from the solid-state frequency divider 3 is projected to the heat-absorbing fluid layer as horizontally as possible, so as to ensure an utilization rate of the energy.

The solid-state frequency divider 3 can intelligently adjust a range of the frequency based on a ratio of working of the optical/thermal unit, that is, the temperature and light intensity that are actually required by the reaction, thereby better separating the solar radiation light. This method is simple, convenient and easy to operate.

During the reaction, the photothermal catalyst and the reaction fluid are conducted to the photothermal coupling reactor 8 after being fully mixed, and, by adjusting the orientations of the solid-state frequency divider 3 and the linear Fresnel reflector 2, dynamically controlling of a quantitative ratio of the two physical fields of the light and the heat is accurately achieved, thereby completing performance tests of the photothermal catalyst under different working conditions.

What is claimed is:

1. A device for producing hydrogen through photothermal coupling of solar energy based on a frequency division technology, comprising a circular arc-shaped secondary reflection element, a photothermal coupling reactor, a plurality of reflectors, and a liquid storage tank having a hollow cavity;
   wherein the liquid storage tank has an inverted U shape, the circular arc-shaped secondary reflection element is provided directly above the liquid storage tank and has an opening facing downward, the liquid storage tank is communicated at a middle position through a temperature-controlled fluid layer, the photothermal coupling reactor is wrapped in the temperature-controlled fluid layer, two solid-state frequency dividers are symmetrically arranged directly under the photothermal coupling reactor, a heat-absorbing fluid layer and a vacuum layer are sequentially provided at an inner side of two sides of the liquid storage tank, and the plurality of the reflectors are arranged side by side directly under the liquid storage tank; during operation, a test sample containing a photothermal catalyst is placed in the photothermal coupling reactor, a light source is collected to the solid-state frequency dividers through the reflectors that are arranged side by side, the solid-state frequency dividers divide the light source into an infrared light part and an ultraviolet light part, and after energy of the infrared light part passes through the vacuum layer and the heat-absorbing fluid layer, the energy is transferred to the temperature-controlled fluid layer, and the temperature-controlled fluid layer transfers thermal energy to the photothermal coupling reactor, and the ultraviolet light part directly penetrates the temperature-controlled fluid layer to project light onto the photothermal catalyst in the photothermal coupling reactor.

2. The device for producing hydrogen through photothermal coupling of solar energy based on the frequency division technology according to claim 1, wherein the reflectors are linear Fresnel reflectors, and reflective surfaces of the reflectors are capable of being rotated based on different orientations of solar radiation light.

3. The device for producing hydrogen through photothermal coupling of solar energy based on the frequency division technology according to claim 1, wherein a plate-type secondary reflection element is further provided at an outer side of the two sides of the liquid storage tank and is configured to reflect energy of the infrared light part that is not completely absorbed by the heat-absorbing fluid layer, so as to make the energy of the infrared light part that is not completely absorbed by the heat-absorbing fluid layer be absorbed by the heat-absorbing fluid layer.

4. The device for producing hydrogen through photothermal coupling of solar energy based on the frequency division technology according to claim 3, wherein the plate-type secondary reflection element has a height consistent with heights of the two sides of the liquid storage tank.

5. The device for producing hydrogen through photothermal coupling of solar energy based on the frequency division technology according to claim 1, wherein the solid-state frequency divider is capable of setting different frequencies or wavelengths of the infrared light and the ultraviolet light based on actual optical/thermal unit ratio requirements.

6. The device for producing hydrogen through photothermal coupling of solar energy based on the frequency division technology according to claim 1, wherein the vacuum layer and the heat-absorbing fluid layer each have a height consistent with heights of the two sides of the liquid storage tank.

7. The device for producing hydrogen through photothermal coupling of solar energy based on the frequency division technology according to claim 1, wherein the device is formed into a symmetrical structure in entirety along a central axis.

8. The device for producing hydrogen through photothermal coupling of solar energy based on the frequency division technology according to claim 1, wherein the light source is solar radiation light irradiated onto a surface of the earth all year round.

9. The device for producing hydrogen through photothermal coupling of solar energy based on the frequency division technology according to claim 1, wherein the photothermal catalyst is a semiconductor catalyst capable of absorbing the ultraviolet light part and part of visible light, and a corresponding wavelength ranges from 180 nm to 700 nm.

10. The device for producing hydrogen through photothermal coupling of solar energy based on the frequency division technology according to claim 1, wherein a working medium in the liquid storage tank is a mixture of water and ethylene glycol.

* * * * *